(12) United States Patent
Schwartz

(10) Patent No.: US 7,364,431 B2
(45) Date of Patent: Apr. 29, 2008

(54) EDUCATIONAL GAME

(76) Inventor: Menashe Schwartz, 90/3 Habanim Way, Pardes Hanna (IL) 37073

(*) Notice: Subject to any disclaimer, the term of this patent is extended or adjusted under 35 U.S.C. 154(b) by 0 days.

(21) Appl. No.: 11/625,378

(22) Filed: Jan. 22, 2007

(65) Prior Publication Data
US 2007/0172800 A1    Jul. 26, 2007

Related U.S. Application Data

(60) Provisional application No. 60/766,482, filed on Jan. 23, 2006.

(51) Int. Cl.
G09B 1/00 (2006.01)

(52) U.S. Cl. .................. 434/209; 434/128; 434/207

(58) Field of Classification Search ............ 434/128, 434/188, 191, 200, 202, 207, 209
See application file for complete search history.

(56) References Cited

U.S. PATENT DOCUMENTS

| | | | | |
|---|---|---|---|---|
| 1,403,989 A * | 1/1922 | Verneau | ...... | 434/208 |
| 2,654,963 A * | 10/1953 | Van Dijck | ...... | 434/207 |
| 3,224,114 A * | 12/1965 | Swanson | ...... | 434/209 |
| 3,456,364 A * | 7/1969 | Alexander | ...... | 434/209 |
| 3,659,851 A * | 5/1972 | Lang et al. | ...... | 273/271 |
| 3,735,504 A * | 5/1973 | Fedyna | ...... | 434/199 |
| 3,975,021 A * | 8/1976 | Brown | ...... | 273/271 |
| 4,445,865 A * | 5/1984 | Sellon | ...... | 434/207 |
| 5,219,289 A * | 6/1993 | Derr | ...... | 434/211 |
| 6,062,864 A * | 5/2000 | Rood | ...... | 434/191 |
| 6,089,871 A * | 7/2000 | Jaffe | ...... | 434/209 |
| 6,695,618 B2 * | 2/2004 | Donn | ...... | 434/209 |
| 7,104,799 B1 * | 9/2006 | Sansing | ...... | 434/195 |

* cited by examiner

Primary Examiner—Kurt Fernstrom

(57) ABSTRACT

A multiplication game consisting of a perforated game board in which the assemblage of perforations forms a rectangular matrix. In a horizontal row of numerals printed on the rim of the board the numerals increase evenly in value from one end to the other end, and below each numeral is disposed a column of perforations. A column of numerals is printed on the edge of the board such that the numerals increase evenly in value from one end to the other end. A set of chips is provided, the total number of which equals to the product of the largest value in the column multiplied by the largest value in the horizontal row, and each chip is insertable in a cut-out window of the board. Each chip has one numeric value inscribed on its upper face, such that for each multiplication of any number in the row with any number of the column there is found a matching numeral on a chip. Two sets of coloured stripes are printed on the upper face of the board, such that all the stripes in each set are parallel, and each stripe in a set is uniquely coloured, and all stripes in a set are perpendicular to all the stripes in the other set.

2 Claims, 4 Drawing Sheets

EDUCATIONAL GAME

I hereby claim the benefit of the priority of the earlier filed U.S. provisional application 60/766,482 entitled 'Educational Game' filed Jan. 23, 2006.

FIELD OF THE INVENTION

The present invention relates to children's games and in particular to such used as teaching aids.

BACKGROUND OF THE INVENTION

Teaching aids are used to promote learning in students of any age. Games are used also to promote learning, mainly for the benefit of children. Mathematics is considered a difficult subject for teaching and games directed towards promoting mathematical knowledge and proficiency are known in the art.

DETAILED DESCRIPTION OF THE PRESENT INVENTION

Figure 1:
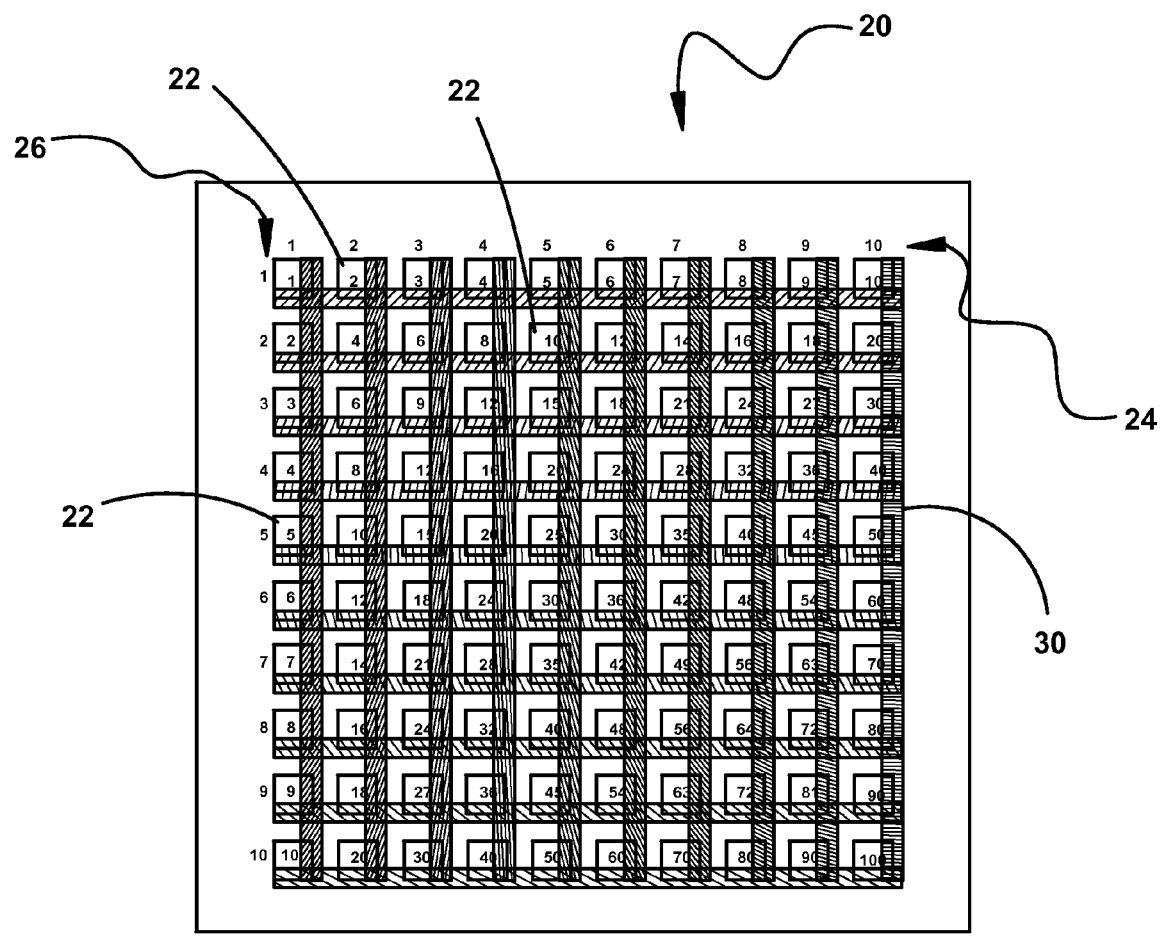
FIG. 1 is a schematic description of the upper face of a board game of the invention with chips inserted in all cut-out windows.

The present invention is an arithmetic game intended for teaching, typically young people, multiplication of numbers. As can be seen in FIG. 1 to which reference is now made, board 20 consists of a planar sheet with perforations in the form of cut-out windows, each housing a planar chip. The assemblage of cut-out windows forms a rectangular or square or matrix. Three exemplary chips are designated 22, snugly fitted each in a respective window. In this example the windows and chips are square, to fit each other, but any other practical form of windows/chips can be implemented. Header row 24 of numbers from one to ten is inscribed on the upper horizontal rim of the board, and header column 26 of numbers from one to ten is inscribed on the left rim of the board. On each chip a certain numeric value is inscribed, selected from one to a hundred so that the numeric value inscribed on each chip matches one multiplication product of a number from header row 24 with a number in header column 26.

Coloring Scheme

Figure 2:
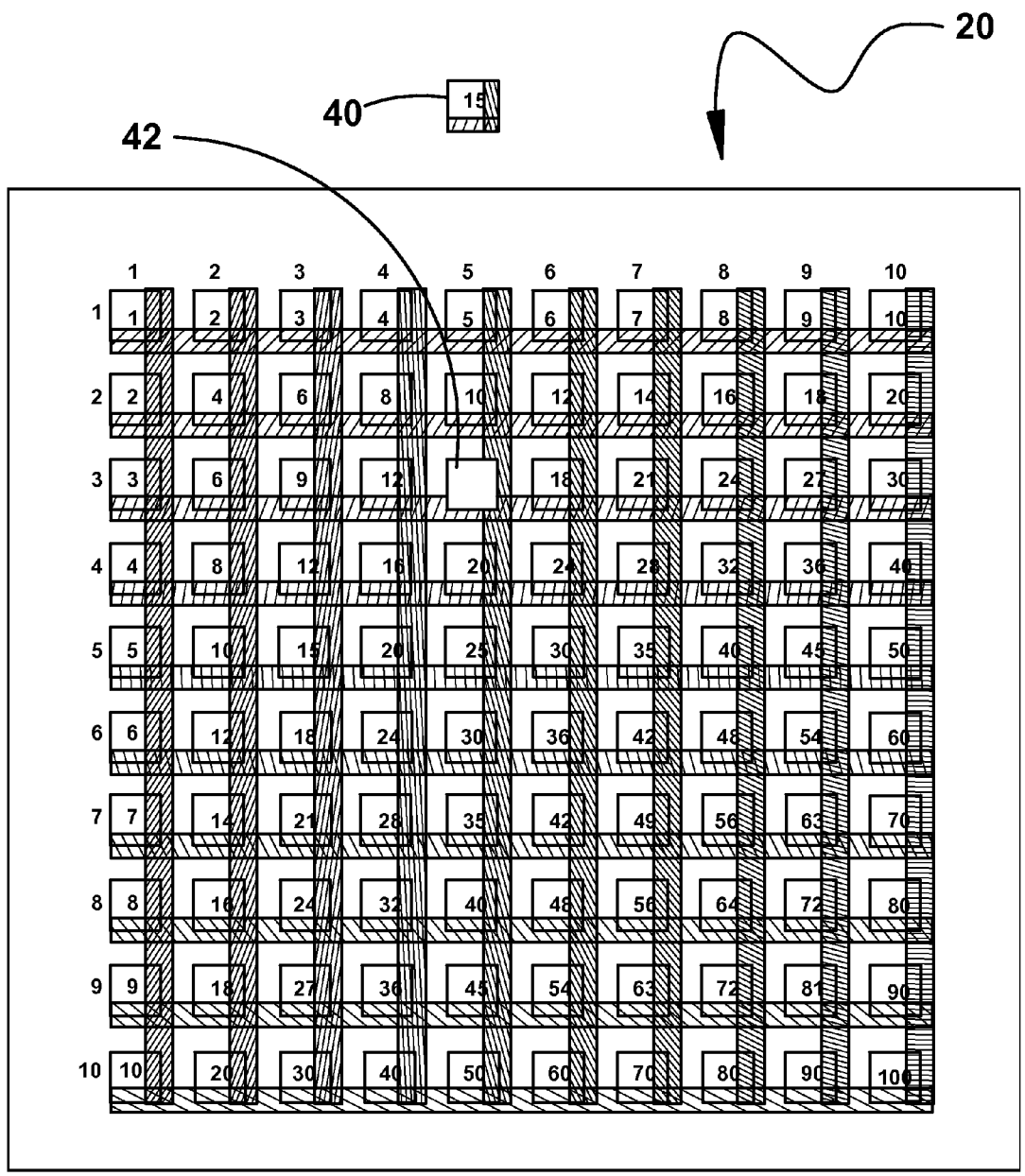
FIG. 2 is a schematic description of the upper face of a board game of the invention with one chip put aside.
Figure 3:
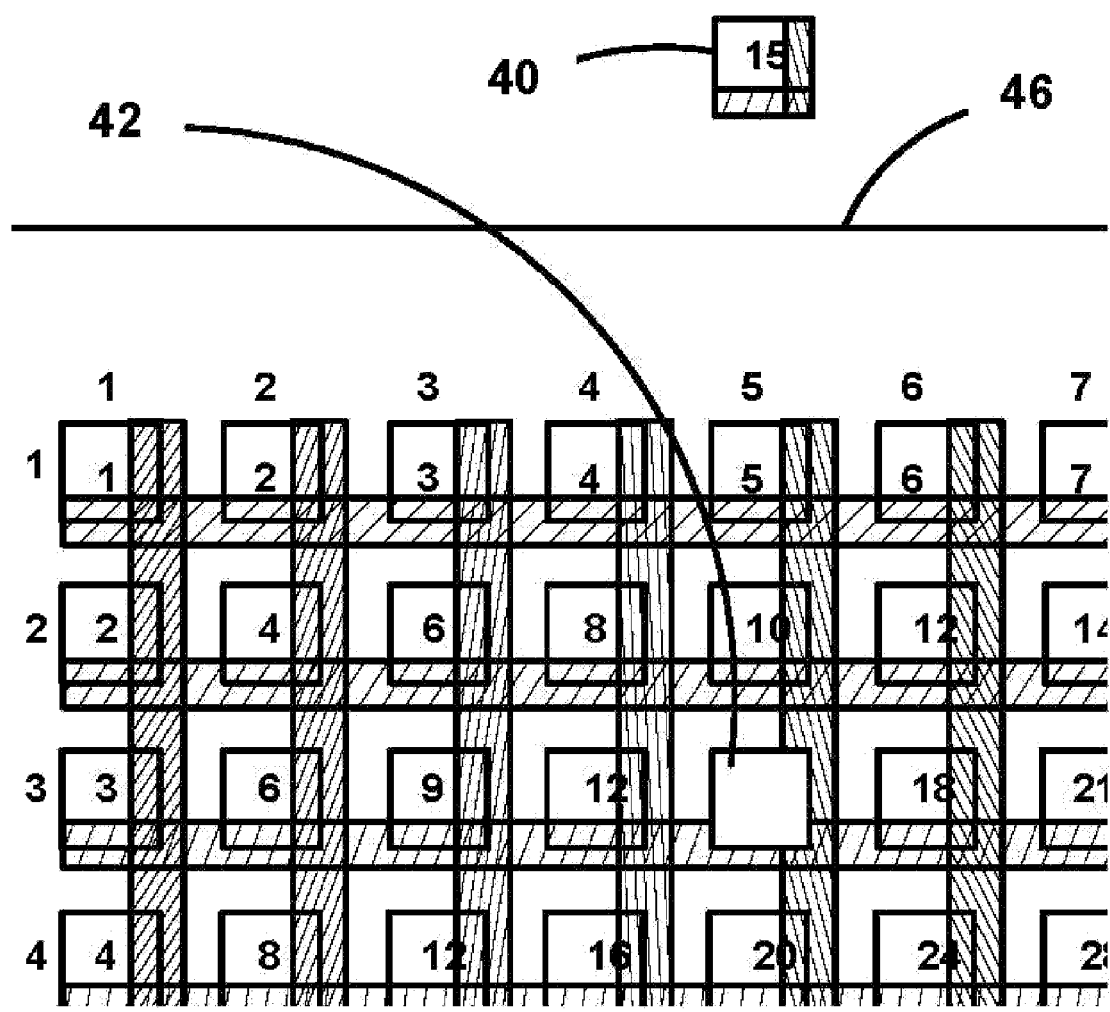
FIG. 3 is a subset of the board game showing the chip put aside and a part of the board.
Figure 4A:
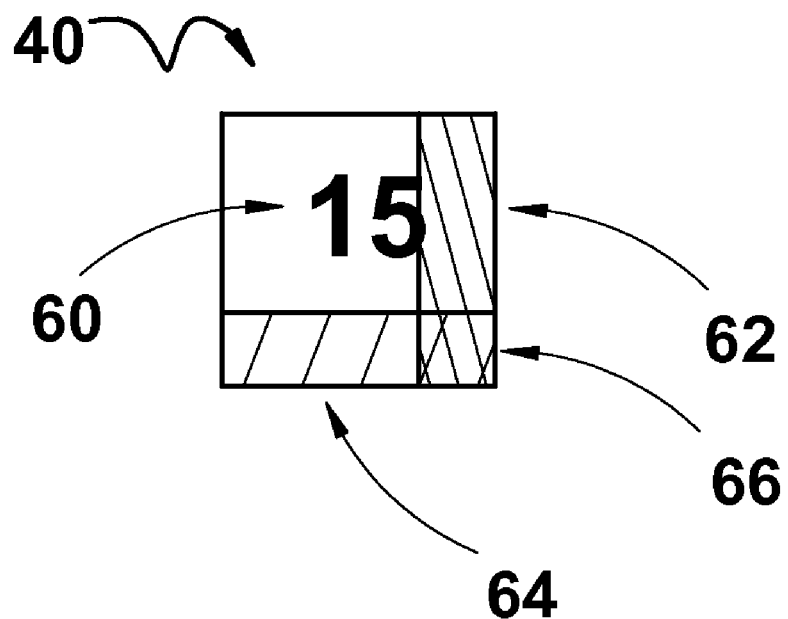
FIG. 4A is a schematic description of the upper face of a chip of the game.
Figure 4B:
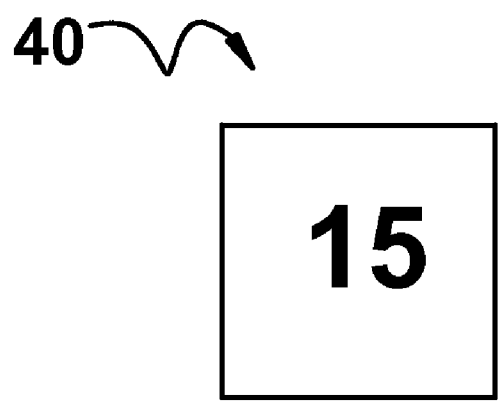
FIG. 4B is a schematic description of the reverse face of a chip of the game, in one embodiment.

On the board, stripes of colours are regularly printed such that an evenly coloured stripe such as stripe 30 represented in the figure by a specific hatching is printed on the board, and a part of the width of the stripe covers the column of chips subtending inscribed numeral ten in row 24. Typically there are ten rows of stripes of different colors and ten columns of stripes of different colors. In FIG. 2 to which reference is now made, chip 40 is shown removed from its cut-out place 42 on board 20. FIG. 3, to which reference is now made, is a subset of FIG. 2, showing chip 40 pulled out of window 42 and put outside of the edge 46 of the board. The numeral 15 is inscribed on the chip, which designates the result of multiplication of the fifth column with the third row on the board. In more detail the upper face of chip 40 is shown in FIG. 4A. Numeric inscription 60 appears on the upper face of the chip. Colour zone 62 on the right, and colour zone 64 on the bottom are both a part of a respective colour stripe drawn on the board, as explained supra. Colour zone 66 is a combination of both colours of each zone merged, however its visible properties may be dictated by the nature of the printing technique used and/or the nature of the dyes used in printing on the board. In one embodiment of the invention the reverse face is devoid of the colours, yet it contains the numeric inscription as in the upper face. Thus the chip's reverse face appears as in FIG. 4B. However, the numeric inscription in the upper face of a specific chip is not necessarily identical with the inscription on the upper face of the chip.

Playing the Game

Some or all of the chips can be removed from the game board. The player, typically a child, is requested to match the chip with the correct place for a chip on the game board. The player is trained to match the chip having a specific numeric inscription, aided by the unique assemblage of colours on the chip. The specific combination of colours on the board can be used as a cue to find the appropriate geometric combination of colours on the chip. In some embodiments of the invention, numerals are inscribed on the reverse face of each chip. In such embodiment, a header row and a header column are printed on the reverse face of the game board, the game can be played without the colour cues.

The invention claimed is:

1. A multiplication game comprising:
   a perforated game board, wherein the assemblage of perforations forms a rectangular matrix;
   a horizontal row of numerals printed on the rim of said board wherein said numerals are evenly increasing in value from one end to the other end, and wherein below each numeral a column of perforations is disposed;
   a column of numerals printed on the edge of said board wherein said numerals are evenly increasing in value from one end to the other end, and sideways from each numeral a row of perforations is disposed;
   a set of chips the total number of which equals to the product of the largest value in said column multiplied by the largest value in said horizontal row, wherein each chip is insertable in a cut-out window of said board, and wherein each chip has one numeric value inscribed on its upper face, such that for each multiplication of any number in said row with any number of said column there is found a matching numeral on a chip, and
   two sets of coloured stripes printed on the upper face of said board, wherein all the stripes in each set are parallel, and wherein each stripe in a set is uniquely coloured, and wherein all stripes in a set are perpendicular to all the stripes in the other set.

2. A multiplication game as in claim 1 wherein each of said chips has a specific numeric value inscribed on its reverse face which equals one specific numeric value on the upper face of a chip, such that the total number of specific numeric values inscribed on the reverse face of said chips equals the total number of specific numeric values on said upper face.

* * * * *